US009914794B2

(12) United States Patent
Al-Enazi

(10) Patent No.: US 9,914,794 B2
(45) Date of Patent: Mar. 13, 2018

(54) PROCESS FOR TRANSITIONING BETWEEN INCOMPATIBLE CATALYSTS

(71) Applicant: SABIC GLOBAL TECHNOLOGIES B.V., Bergen op Zoom (NL)

(72) Inventor: Nayef M. Al-Enazi, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/313,758

(22) PCT Filed: May 26, 2015

(86) PCT No.: PCT/EP2015/061560
§ 371 (c)(1),
(2) Date: Nov. 23, 2016

(87) PCT Pub. No.: WO2015/181151
PCT Pub. Date: Dec. 3, 2015

(65) Prior Publication Data
US 2017/0190816 A1      Jul. 6, 2017

Related U.S. Application Data

(60) Provisional application No. 62/161,400, filed on May 14, 2015.

(30) Foreign Application Priority Data

May 27, 2014   (EP) .................................. 14170018

(51) Int. Cl.
*C08F 210/16*   (2006.01)
(52) U.S. Cl.
CPC ................. *C08F 210/16* (2013.01)

(58) Field of Classification Search
None
See application file for complete search history.

(56) References Cited

U.S. PATENT DOCUMENTS 2,825,721 A    3/1958  Hogan et al.
3,023,203 A    2/1962  Dye
(Continued)

FOREIGN PATENT DOCUMENTS

EP      0640625 A2    3/1995
WO      0058377 A1   10/2000
(Continued)

OTHER PUBLICATIONS

Fripiat et al.; "Hydroxyl Content in Silica Gel 'Aerosil'"; Journal of Physical Chemistry; vol. 66, Issue 5; 1962; pp. 800-805.
(Continued)

*Primary Examiner* — Catherine S Branch
(74) *Attorney, Agent, or Firm* — Cantor Colburn LLP

(57) ABSTRACT

The invention relates to a process for transitioning from a first continuous polymerization reaction of ethylene and a first comonomer for producing a linear low density polyethylene conducted in the presence of a Ziegler-Natta catalyst in a gas phase reactor to a second continuous polymerization reaction of ethylene and a second comonomer for producing a high density polyethylene conducted in the presence of a chromium-based catalyst in the gas phase reactor, the process comprising: (i) reducing the feed of the first comonomer into the reactor until the ratio of the first comonomer to ethylene in the reactor is at most 0.1; (ii) discontinuing the introduction of the Ziegler-Natta catalyst while the introduction of a co-catalyst of the Ziegler-Natta catalyst is continued and subsequently discontinuing the introduction of the co-catalyst; (iii) maintaining the polymerization conditions in the reactor and permitting polymerization to continue for a time in order to allow the compo- (Continued)

nents of the Ziegler-Natta catalyst present in the reactor to consume themselves in the production of additional polymer; (iv) discontinuing the introduction of all feeds into the reactor; (v) depressurizing the reactor; (vi) flow-purging the reactor; (vii) reducing the reactor temperature; (viii) introducing ethylene and $H_2$ into the reactor to obtain a partial pressure of ethylene and a volume ratio of $H_2$ to ethylene for the second polymerization reaction, wherein the partial pressure of ethylene is increased to the pressure for the second polymerization reaction at such a speed that the reactor temperature is maintained at a temperature lower than the temperature of the first polymerization conditions; (ix) increasing the reactor temperature to a temperature of the second polymerization conditions; (x) introducing the second catalyst into the reactor and (xi) introducing the second comonomer into the reactor to obtain a reactor composition for the second polymerization reaction.

14 Claims, 2 Drawing Sheets

(56) References Cited

U.S. PATENT DOCUMENTS

| | | | |
|---|---|---|---|
| 3,324,101 | A | 6/1967 | Baker et al. |
| 3,622,251 | A | 11/1971 | Allen |
| 3,622,521 | A | 11/1971 | Hogan et al. |
| 3,687,920 | A | 8/1972 | Johnson |
| 3,704,287 | A | 11/1972 | Johnson et al. |
| 4,011,382 | A | 3/1977 | Levine et al. |
| 4,086,408 | A | 4/1978 | Karol et al. |
| 4,100,105 | A | 7/1978 | Levine et al. |
| 4,101,445 | A | 7/1978 | Levine et al. |
| 4,376,191 | A | 3/1983 | Geck |
| 4,460,755 | A | 7/1984 | Williams et al. |
| 4,482,687 | A | 11/1984 | Noshay et al. |
| 4,543,399 | A | 9/1985 | Jenkins, III et al. |
| 4,560,671 | A | 12/1985 | Gross et al. |
| 4,588,790 | A | 5/1986 | Jenkinks, III et al. |
| 4,719,193 | A | 1/1988 | Levine et al. |
| 4,755,495 | A | 7/1988 | Cann et al. |
| 4,798,081 | A | 1/1989 | Hazlitt et al. |
| 5,019,633 | A | 5/1991 | Wagner et al. |
| 5,070,055 | A | 12/1991 | Schramm et al. |
| 5,442,019 | A | 8/1995 | Agapiou et al. |
| 5,672,666 | A | 9/1997 | Muhle et al. |
| 5,753,786 | A | 5/1998 | Agapiou et al. |
| 6,858,684 | B2 | 2/2005 | Burdett et al. |
| 6,949,612 | B2 | 9/2005 | Agapiou et al. |
| 2003/0114609 | A1 | 6/2003 | Samson |
| 2004/0143076 | A1 | 7/2004 | Terry et al. |
| 2016/0297900 | A1 | 10/2016 | Banat et al. |

FOREIGN PATENT DOCUMENTS

| | | |
|---|---|---|
| WO | 2004094489 A1 | 11/2004 |
| WO | 2006130310 A1 | 12/2006 |
| WO | 2012069157 A1 | 5/2012 |

OTHER PUBLICATIONS

International Search Report for International Application No. PCT/EP2015/061560; dated Aug. 4, 2015; 4 pages.

Wild et al.; "Determination of Branching Distributions in Polyethylene and Ethylene Copolymers"; Journal of Polymer Science: Polymer Physics Edition; vol. 20; 1982; pp. 441-455.

Written Opinion of the International Search Report for International Application No. PCT/EP2015/061560; dated Aug. 4, 2015; 5 pages.

PROCESS FOR TRANSITIONING BETWEEN INCOMPATIBLE CATALYSTS

CROSS REFERENCE TO RELATED APPLICATIONS

This application is a 371 of International Application No. PCT/EP2015/061560, filed May 26, 2015, which claims priority to U.S. Application No. 62/161,400, filed May 14, 2015 and European Application No. 14170018.7, filed May 27, 2014 all of which are incorporated herein by reference in their entirety.

This invention relates to a process for transitioning between incompatible polymerization catalyst systems. Particularly, the invention relates to a process for transitioning from an olefin polymerization reaction utilizing a traditional Ziegler-Natta catalyst system to an olefin polymerization reaction utilizing a chromium based catalyst system in a gas phase fluidized bed reactor.

It is frequently necessary to transition from one type of catalyst system producing polymers having certain properties and characteristics to another catalyst system capable of producing polymers of different chemical and/or physical attributes. Transitioning between similar Ziegler-Natta catalyst systems or compatible catalyst systems generally takes place easily. Compatible catalysts are those catalysts having similar kinetics of termination and insertion of monomer and comonomer (s) and/or do not detrimentally interact with each other.

However, the process is typically complicated when the catalyst systems are incompatible or of different types. For example, when transitioning between two incompatible catalyst systems such as a Ziegler-Natta catalyst system and a chromium based catalyst system, some of the components of the Ziegler-Natta catalyst system act as poisons to the a chromium based catalyst system. Consequently, the components of the Ziegler-Natta catalyst system prevent the chromium based catalyst system from promoting polymerization.

Furthermore, particularly in a continuous transition process, the interaction between two incompatible catalysts may lead to the production of high levels of small particles less than about 120 microns that are referred to as "fines". Fines can induce operability problems in the reactor and/or fouling and sheeting incidents.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition and the off-grade material.

There have been many attempts to improve the process for transitioning between incompatible catalysts.

Naturally, in order to inhibit polymerization of a first incompatible catalyst, it is necessary to interrupt catalyst injection into the reactor. Stopping the first catalyst feed into the reactor does not immediately stop polymerization reactions occurring within the reactor because the fluidized bed contains catalyst particles which can still polymerize for an extended period of time. Even if one were to allow the polymerization reactions within the reactor to continue for a period of time, the catalyst within the reactor would not be completely deactivated for a considerable period.

Thus, to substantially terminate these polymerization reactions within the reactor, it is known to employ polymerization inhibitors or "catalyst killers". There are two general types of polymerization inhibitors: reversible catalyst killers and irreversible catalyst killers. Reversible catalyst killers typically initially inhibit catalyst activity and polymerization for a period of time, but, do not irreversibly deactivate the catalyst. In fact, after a period of time under normal polymerization conditions the catalysts reactivate and polymerization will continue. These reversible catalyst killers can be used in any combination or order of introduction in the process. Irreversible catalyst killers irreversibly inactivate a catalyst's ability to polymerize olefins. The use of catalyst killing and/or deactivating agents is disclosed in U.S. Pat. Nos. 5,442,019, 5,753,786, and 6,949,612 B2 to Agapiou et al., U.S. Pat. No. 5,672,666 to Muhle et al., and U.S. Pat. No. 6,858,684 B2 to Burdett et al.

WO2006130310 describes existing technology for the transitioning process from a Ziegler type catalyst to a chromium-based catalyst. One transition procedure from a Ziegler-type catalyst to a chromium catalyst uses silica injection to bind the free triethylaluminum (or other aluminum alkyl)-electron donor complexes, typically present in almost all second generation Ziegler type catalysts, and which inhibit chromium catalyst activity. The surface silanols on the silica are theorized to bind these complexes, and this binding effectively scavenges the aluminum alkyl and electron donor complexes to levels conducive for chromium catalyst initiation and good reactor operability. However, commercial experience with this complex transition has not been reproducible, and periodically, this transition mechanism results in reactor shutdowns. Systematic signs of reactor operability problems, observed when using this procedure, have been failure of the transition due to static induced sheeting, high levels of static cold banding during silica injection leading to bed segregation and sheeting; additional off grade due to gels caused by the silica, and temperature excursions within the fluidized bed, evidenced by thermocouple activity and plate thermowell activity upon reaction initiation, leading to sheeting and agglomerate formation. In addition, the use of silica as an adsorbent of the TEA1/THF complex does not completely bind all of the alkyl in the reaction system, and the remaining small amounts of aluminum alkyls can result in extremely high chromium activity that can also lead to reactor operability problems.

U.S. Pat. No. 4,460,755 discloses a method of converting an olefin polymerization catalyzed by a Ziegler-type catalyst to a polymerization catalyzed by a chromium-based catalyst, which involves adding a hydroxyl-containing compound to the reactor containing the Ziegler-type catalyst. These transitions primarily operate by discontinuing the introduction of the components of the Ziegler catalyst system into the polymerization reactor, and adding a hydroxyl-containing silica that reacts with and absorbs components of the Ziegler catalyst system. Such silica injection has a problem as described above.

WO2006130310 discloses a process for transitioning a continuous olefin polymerization reaction catalyzed by a Ziegler-type catalyst to a polymerization catalyzed by chromium-based catalyst. In this process, after discontinuing the introduction of the Ziegler-type catalyst, a reversible poison and/or an irreversible poison is introduced into the reactor, the poison is circulated within the reactor and the reactor is purged with an inert gas.

It would be advantageous to provide a catalyst transitioning process without the need for halting the polymerization reaction, emptying the reactor to rid it of the original catalyst system and restarting the polymerization reaction with another catalyst system. In addition, it would be advantageous if the process for transitioning could reduce the amount of off-grade material produced during the transition process, reduce the transition time, increase the robustness and stability of the transition process and avoid the need to open the reactor to charge the seed bed.

It would further be advantageous to provide a catalyst transitioning process which does not require the use of a catalyst killer.

It is an object of the present invention to provide a process in which above-described and/or other problems are solved.

Accordingly, the present invention provides a process for transitioning from a first continuous polymerization reaction of ethylene and a first comonomer for producing a linear low density polyethylene conducted in the presence of a Ziegler-Natta catalyst in a gas phase reactor to a second continuous polymerization reaction of ethylene and a second comonomer for producing a high density polyethylene conducted in the presence of a chromium-based catalyst in the gas phase reactor, the process comprising:
(i) reducing the feed of the first comonomer into the reactor until the ratio of the first comonomer to ethylene in the reactor is at most 0.1;
(ii) discontinuing the introduction of the Ziegler-Natta catalyst while the introduction of a co-catalyst of the Ziegler-Natta catalyst is continued and subsequently discontinuing the introduction of the co-catalyst;
(iii) maintaining the polymerization conditions in the reactor and permitting polymerization to continue for a time in order to allow the components of the Ziegler-Natta catalyst present in the reactor to consume themselves in the production of additional polymer;
(iv) discontinuing the introduction of all feeds into the reactor;
(v) depressurizing the reactor;
(vi) flow-purging the reactor;
(vii) reducing the reactor temperature;
(viii) introducing ethylene and $H_2$ into the reactor to obtain a partial pressure of ethylene and a volume ratio of $H_2$ to ethylene for the second polymerization reaction, wherein the partial pressure of ethylene is increased to the pressure for the second polymerization reaction at such a speed that the reactor temperature is maintained at a temperature lower than the temperature of the first polymerization conditions;
(ix) increasing the reactor temperature to a temperature of the second polymerization conditions;
(x) introducing the second catalyst into the reactor and
(xi) introducing the second comonomer into the reactor to obtain a reactor composition for the second polymerization reaction.

It was surprisingly found that the transitioning process according to the invention can be performed without the use of a catalyst killer. A successful transitioning can therefore be performed in a short time.

Figure 1:
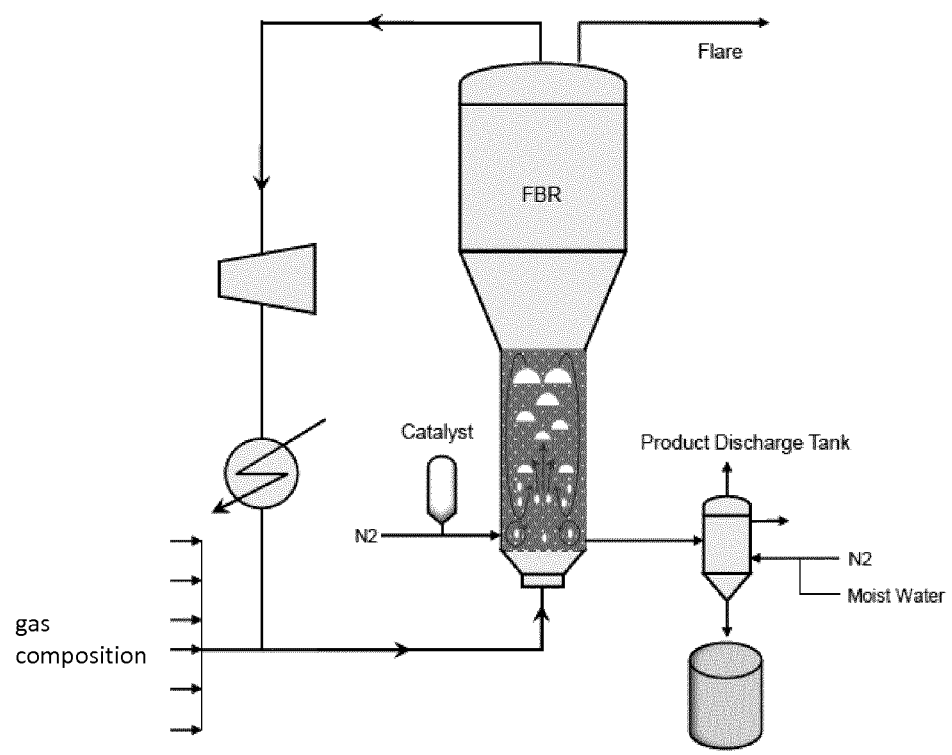
FIG. 1 shows a gas phase reactor system.

In the process according to the invention, the first comonomer volume ratio is first reduced in step (i). The reduction of the first comonomer ratio leads to increase of the density of the LLDPE produced. It was found that this was necessary for avoiding the occurrence of stickiness in the bed. The volume ratio of the first comonomer to ethylene during the first polymerization may be in any range suitable for obtaining desired LLDPE, e.g. 0.3-0.5, more preferably 0.4-0.5. The ratio of the first comonomer to ethylene in the reactor is reduced to at most 0.10, preferably at most 0.05.

In step (ii), the introduction of the Ziegler-Natta catalyst is discontinued while the introduction of a co-catalyst of the Ziegler-Natta catalyst is continued. The introduction of the co-catalyst is discontinued after a period of time after the discontinuation of the Ziegler-Natta catalyst. It was found that this prevents the active transition metal halide remaining in the reactor to cause an uncontrolled reaction with ethylene later introduced. The co-catalyst may be stopped e.g. 0.25-2 hours or more preferably 0.5-1 hour after the discontinuation of the Ziegler-Natta catalyst.

In step (iii), after the introduction of the Ziegler-Natta catalyst and the co-catalyst is discontinued, the polymerization conditions in the reactor are maintained in order to allow the components of the Ziegler-Natta catalyst present in the reactor to consume themselves in the production of additional polymer. The polymerization conditions maintained in the reactor may e.g. be a reactor temperature of 83-88° C., e.g. 85° C., a reactor pressure of 15-25 barg, e.g. 18-22 barg, e.g. 20.7 barg, ethylene partial pressure of 5-10 bara, e.g. 7 bara, $H_2$/ethylene ratio of 0.05-0.2, e.g. 0.14.

Subsequently, all feeds are stopped in step (iv). The introduction of $H_2$ and ethylene may be discontinued at the same time, or the introduction of $H_2$ may be discontinued before ethylene or the introduction of ethylene may be discontinued before $H_2$. It is preferred that the discontinuation of the introduction of $H_2$ and the discontinuation of the introduction of ethylene is done within a relatively short time from each other, e.g. within 5-10 minutes from each other. Preferably, step (iv) is performed by discontinuing the introduction of ethylene while the introduction of $H_2$ is continued and subsequently (e.g. after 5-10 minutes) discontinuing the introduction of $H_2$. This assists in having no polymerization reaction at this stage.

In step (v), the reactor is depressurized. The reactor may be depressurized to e.g. 5-9 barg or 6-8 barg.

During the polymerization with the Ziegler-Natta catalyst, gases accumulate within the reactor, which originate from the electron donor. These gases are typically poisonous to the incompatible chromium-based catalyst. These gases for a traditional Ziegler-Natta catalyst include, for example, tetrahydrofuran (THF), ethanol, ethyl benzoate and the like.

Thus, before introducing the second incompatible catalyst the reactor contents are subjected to what is known in the art as pressure purging. In step (vi), the reactor is flow-purged.

Once this procedure is complete the gas composition in the reactor system is adjusted to the second polymerization reaction for obtaining the desired HDPE by the chromium-based catalyst. In the process of the present invention, following specific measures are taken before the gas composition in the reactor is adjusted to the second polymerization reaction.

In step (vii), the reactor temperature is decreased before the injection of ethylene and hydrogen in step (viii). It was found that it was crucial to inject ethylene and hydrogen into the reactor while maintaining the lowered temperature. Injection of ethylene at a higher temperature leads to the bed temperature increasing rapidly. It was found that the rapid increase of the bed temperature could cause agglomerations or lumps in the bed. Preferably, the reactor temperature is decreased to a temperature at least 4° C. lower than the temperature in step (iii), more preferably to a temperature at least 5° C. lower than the temperature in step (iii). Preferably, the reactor temperature is decreased to a temperature less than 81° C.

In step (viii), ethylene and $H_2$ are introduced into the reactor to obtain a partial pressure of ethylene and a volume ratio of $H_2$ to ethylene desired for the second polymerization reaction. The partial pressure of ethylene is increased to the partial ethylene pressure for the second polymerization reaction at such a speed that the reactor temperature is maintained at a temperature lower than the temperature of the first polymerization conditions. The partial pressure of ethylene for the second polymerization reaction is herein meant the desired partial pressure of ethylene during the second polymerization reaction. The volume ratio of $H_2$ to ethylene for the second polymerization reaction is herein meant the desired volume ratio of $H_2$ to ethylene during the second polymerization. Maintaining the low temperature prevents the formation of agglomerations or lumps in the bed. Preferably, step (viii) is performed by increasing the partial pressure of ethylene to an intermediate pressure at a first speed and to the pressure for the second polymerization reaction at a second speed lower than the second speed. Preferably, the intermediate pressure is 5-7 bara lower than the target pressure. Preferably, the intermediate pressure is 8-12 bara. Preferably, the target pressure is 13-17 bara. The first speed may e.g. be 10 kg/hr flow rate. The second speed may e.g. be 5 kg/hr flow rate. At this point, the second co-monomer is not introduced to the reactor.

The introduction of $H_2$ to the reactor may be started while the partial pressure of ethylene is increased. However, preferably, the introduction of $H_2$ to the reactor is started after the partial pressure of ethylene for the second polymerization reaction is reached. The volume ratio of $H_2$ to ethylene in the reactor is thereby adjusted to the desired ratio for the second polymerization. The volume ratio of $H_2$ to ethylene in the reactor for the second polymerization may e.g. be 0.01-0.05, preferably 0.01-0.03.

In step (ix), after the target ethylene partial pressure and $H_2$ to ethylene ratio are reached, the temperature is gradually raised to the temperature suitable for the second polymerization. The temperature for the second polymerization may be 95 to 105° C., e.g. be 100° C. The temperature increase speed may e.g. be 2° C. per hour.

In step (x), the second catalyst is introduced into the reactor. The ethylene starts to polymerize.

In step (xi), the second co-monomer is introduced into the reactor at a desired ratio with respect to ethylene. The volume ratio of the second comonomer to ethylene during the second polymerization may be in any range suitable for obtaining desired HDPE, e.g. 0.0010-0.0030. By this step, the reactor composition is adjusted to a composition suitable for obtaining the desired HDPE under the presence of a chromium-based catalyst.

It was found that the combination of these steps led to the successful transitioning from a polymerization using a Ziegler-Natta catalyst to a polymerization using a chromium-based catalyst without the use of a catalyst killer.

Furthermore, the process according to the invention advantageously eliminates the problem with starting up a reactor with chromium-based catalysts. To start-up a reactor with the use of chromium-based catalysts, the reactor loop must be purged sufficiently to remove all $O_2$ and $H_2O$ to low limits in ppm level. Chromium-based catalysts are extremely sensitive to $O_2$ and $H_2O$. The presence of an even small amount of $O_2$ and $H_2O$ causes problems such as the generation of fine particles and bed segregation which may turn the bed to powder which will not fluidize. Removal of $O_2$ and $H_2O$ to a sufficient level requires purging and heating for a long time consumes time and cost.

By first performing a reaction with the Ziegler-Natta catalyst, the long purging step for the starting up of the reactor is eliminated. Although not wishing to be bound by any theory, the inventors believe that $O_2$ and $H_2O$ which were present in the reactor are consumed by the first reaction and the chromium-based catalysts are hence not poisoned by $O_2$ and $H_2O$.

Polymers Obtained by the Process

The first polymerization reaction results in a linear low density polyethylene (LLDPE). The first monomer may be a C3-C10 alpha-olefin comonomer. Suitable alpha-olefin comonomers include 1-butene, 1-hexene, 4-methyl pentene and 1-octene. The preferred comonomer is 1-butene and 1-hexene, in particular 1-butene. Preferably, the alpha-olefin co monomer is present in an amount of about 5 to about 20 percent by weight of the LLDPE, more preferably an amount of from about 7 to about 15 percent by weight of the LLDPE.

Preferably, the linear low density polyethylene (LLDPE) has a density from 915 to 930 kg/m$^3$ as determined by ASTM D-1505. Preferably, the melt flow index of the linear low density polyethylene as determined by ASTM D-1238—Condition E (190° C., 2.16 kg) ranges from 0.1 to 4 g/10 min, for example from 0.3 to 3 g/10 min, for example from 0.2 to 2 g/10 min, for example from 0.5 to 1.5 g/10 min.

The unreacted catalyst in the LLDPE is preferably low. The unreacted catalyst can be determined by measuring the ash content. Accordingly, the LLDPE obtained by the first polymerization comprises at most 0.045 wt % of ash content as determined by ASTM D5630.

The second polymerization reaction results in a high density polyethylene (HDPE). The second comonomer may be an α-olefin monomer having from 4 to 8 carbon atoms, e.g. 1-butene, 1-hexene or 1-octene, preferably 1-hexene.

Preferably, the density of the HDPE ranges from 940 to 965 kg/m$^3$ as determined by ASTM D-1505. Preferably, the melt flow index as determined using ASTM D-1238—Condition F (190° C., 21.6 kg) ranges from 5 to 15 g/10 min.

Ziegler-Natta Catalyst

Traditional Ziegler-Natta catalysts typically in the art comprise a transition metal halide, such as titanium or vanadium halide, and an organometallic compound of a metal of Group 1, 2 or 3, typically trialkylaluminum compounds, which serve as an activator or a co-catalyst for the transition metal halide. Some Ziegler-Natta catalyst systems incorporate an internal electron donor which is complexed to the alkyl aluminum or the transition metal. The transition metal halide may be supported on a magnesium halide or complexed thereto. This Ziegler-Natta catalyst may also be impregnated onto an inorganic support such as silica or alumina. Complete activation of Ziegler-Natta catalyst in the reactor is achieved by the addition of a cocatalyst, which is typically the organometallic compound as mentioned above. For more details on traditional Ziegler-Natta catalysts, see for example, U.S. Pat. Nos. 3,687,920, 4,086,408, 4,376,191, 5,019,633, 4,482,687. 4,101,445, 4,560,671, 4,719,193, 4,755,495, 5,070,055 all of which are herein incorporated by reference.

Preferably, the Ziegler-Natta catalyst is prepared by
(a) contacting a dehydrated support having hydroxyl groups with a magnesium compound having the general formula MgR$^1$R$^2$, wherein R$^1$ and R$^2$ are the same or different and are independently selected from the group comprising an alkyl group, alkenyl group, alkadienyl group, aryl group, alkaryl group, alkenylaryl group and alkadienylaryl group;
(b) contacting the product obtained in step (a) with modifying compounds (A), (B) and (C), wherein:
(A) is at least one compound selected from the group consisting of carboxylic acid, carboxylic acid ester, ketone, acyl halide, aldehyde and alcohol;

(B) is a compound having the general formula $R^{11}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;

(C) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and (c) contacting the product obtained in step (b) with a titanium halide compound having the general formula $TiX_4$, wherein Ti is a titanium atom and X is a halide atom.

This catalyst is described in WO2012069157, incorporated herein by reference.

The process for preparing the Ziegler-Natta catalyst component comprises a first step (a) of contacting a dehydrated solid support having hydroxyl (OH) groups with a magnesium compound to form a solid magnesium containing support material.

The solid support is any material containing hydroxyl groups. Suitable examples of such materials include inorganic oxides, such as silica, alumina, magnesia, thoria, zirconia and mixtures of such oxides. Preferably, porous silica is used as the support as higher bulk densities and higher catalyst productivities are obtained therewith. Silica may be in the form of particles having a mean particle diameter of about 1 micron to about 500 microns, preferably from 5 microns to 150 microns and most preferably from 10 microns to 100 microns. Lower mean particle diameter produce a higher level of polymer fines and higher mean particle diameter reduces polymer bulk density. The silica may have a surface area of about 5 m²/g to about 1500 m²/g, preferably from 50 m²/g to 1000 m²/g and a pore volume of from about 0.1 cm³/g to about 10.0 cm³/g, preferably from 0.3 cm³/g to 3.5 cm³/g, as higher catalyst productivity is obtained in this range.

The dehydrated solid support can be obtained by drying the solid support in order to remove physically bound water and to reduce the content of hydroxyl groups to a level which may be of from about 0.1 mmol to about 5.0 mmol hydroxyl groups per gram of support, preferably from about 0.2 mmol to about 2.0 mmol hydroxyl groups per gram of support, as this range allows sufficient incorporation of the active catalyst components to the support, determined by the method as described in J. J. Fripiat and J. Uytterhoeven, J. Phys. Chem. 66, 800, 1962 or by applying ¹H NMR spectroscopy. The hydroxyl groups content in this range may be achieved by heating and fluidizing the support at a temperature of from about 150° C. to about 900° C. for a time of about 1 hour to about 15 hours under a nitrogen or air flow. The dehydrated support can be slurried, preferably by stirring, in a suitable hydrocarbon solvent in which the individual catalyst components are at least partially soluble. Examples of suitable hydrocarbon solvents include n-pentane, isopentane, cyclopentane, n-hexane, isohexane, cyclohexane, n-heptane, isoheptane, n-octane, isooctane and n-decane. The amount of solvent used is not critical, though the solvent should be used in an amount to provide good mixing of the catalyst components.

The magnesium compound is represented by the general formula $MgR^1R^2$, wherein $R^1$ and $R^2$ are the same or different and are independently selected from a group comprising an alkyl group, alkenyl group, alkadienyl group, aryl group, alkaryl group, alkenylaryl group and an alkadienylaryl group and may have from 1 to 20 carbon atoms. Suitable examples of the magnesium compound include dimethylmagnesium, diethylmagnesium, ethylmethylmagnesium, di-n-propylmagnesium, diisopropylmagnesium, n-propylethylmagnesium, isopropylethylmagnesium, di-n-butylmagnesium, diisobutylmagnesium, n-butylethylmagnesium, n-butyl-n-propylmagnesium, n-butylisopropylmagnesium, isobutylethylmagnesium, isobutyl-n-propylmagnesium, isobutylisopropylmagnesium, di-n-pentylmagnesium, diisopentylmagnesium, n-pentylethylmagnesium, n-pentyl-n-propylmagnesium, n-pentylisopropylmagnesium, n-pentyl-n-butylmagnesium, n-pentylisobutylmagnesium, di-n-hexylmagnesium, diisohexylmagnesium, n-hexylethylmagnesium, n-hexyl-n-propylmagnesium, n-hexylisopropyl magnesium, n-hexyl-n-butylmagnesium, n-hexylisobutylmagnesium, isohexylethylmagnesium, isohexyl-n-propylmagnesium, isohexylisopropyl magnesium, isohexyl-n-butylmagnesium, isohexylisobutylmagnesium, di-n-octylmagnesium, diisooctylmagnesium, n-octylethylmagnesium, n-octyl-n-propylmagnesium, n-octylisopropylmagnesium, n-octyl-n-butylmagnesium, n-octylisobutyl magnesium, isooctylethylmagnesium, isooctyl-n-propylmagnesium, isooctylisopropylmagnesium, isooctyl-n-butylmagnesium, isooctylisobutyl magnesium, dicyclopentylmagnesium, cyclopentylethylmagnesium, cyclopentyl-n-propylmagnesium, cyclopentylisopropylmagnesium, cyclopentyl-n-butylmagnesium, cyclopentylisobutylmagnesium, dicyclohexylmagnesium, cyclohexylethylmagnesium, cyclohexyl-n-propylmagnesium, cyclohexylisopropyl magnesium, cyclohexyl-n-butylmagnesium, cyclohexylisobutylmagnesium, diphenylmagnesium, phenylethylmagnesium, phenyl-n-propylmagnesium, phenyl-n-butylmagnesium and mixtures thereof.

Preferably, the magnesium compound is selected from the group comprising di-n-butylmagnesium, n-butylethylmagnesium and n-octyl-n-butylmagnesium.

The magnesium compound can be used in an amount ranging from about 0.01 to about 10.0 mmol per gram of solid support, preferably from about 0.1 to about 3.5 mmol per gram of support and more preferably from 0.3 to 2.5 mmol per gram of support as by applying this range the level of polymer fines of the product is reduced and higher catalyst productivity is obtained. The magnesium compound may be reacted, preferably by stirring, with the support at a temperature of about 15° C. to about 140° C. during about 5 minutes to about 150 minutes, preferably at a temperature of about 20° C. to 80° C. for a duration of 10 minutes to 100 minutes.

The molar ratio of Mg to OH groups in the solid support can be in the range of about 0.01 to about 10.0, preferably of from about 0.1 to about 5.0 and more preferably of from about 0.1 to about 3.5, as the level of polymer fines of the product is reduced and higher catalyst productivity is obtained.

The modifying compound (A) is at least one compound selected from the group consisting of carboxylic acids, carboxylic acid esters, ketones, acyl halides, aldehydes and alcohols. The modifying compound (A) may be represented by the general formula $R^3COOH$, $R^4COOR^5$, $R^6COR^7$, $R^8COX$, $R^9COH$ or $R^{10}OH$, wherein X is a halide atom and $R^3, R^4, R^5, R^6, R^7, R^8, R^9$ and $R^{10}$ are independently selected from a group of compounds comprising an alkyl group, alkenyl group, alkadienyl group, aryl group, alkaryl group, alkenylaryl group and an alkadienylaryl group and may have from 1 to 20 carbon atoms.

Suitable examples of the carboxylic acids include acetic acid, propionic acid, isopropionic acid, butyric acid, isobutyric acid, valeric acid, isovaleric acid, caproic acid, isocaproic acid, enanthic acid, isoenanthic acid, caprylic acid, isocaprylic acid, pelargonic acid, isopelargonic acid, capric acid, isocapric acid, cyclopentanecarboxylic acid, benzoic acid and mixtures thereof.

Suitable examples of carboxylic acid esters include methyl acetate, ethyl acetate, n-propyl acetate, isopropyl acetate, n-butyl acetate, isobutyl acetate, isoamyl acetate, ethyl butyrate, n-butyl butyrate and/or isobutyl butyrate.

Suitable examples of ketones include dimethyl ketone, diethyl ketone, methyl ethyl ketone, di-n-propyl ketone, di-n-butyl ketone, methyl n-propyl ketone, methyl isobutyl ketone, cyclohexanone, methyl phenyl ketone, ethyl phenyl ketone, n-propyl phenyl ketone, n-butyl phenyl ketone, isobutyl phenyl ketone, diphenyl ketone and mixtures thereof.

Suitable examples of acyl halides include ethanoyl chloride, propanoyl chloride, isopropanoyl chloride, n-butanoyl chloride, isobutanoyl chloride, benzoyl chloride and mixtures thereof.

Suitable examples of aldehydes include acetaldehyde, propionaldehyde, n-butyraldehyde, isobutyraldehyde, n-pentanaldehyde, isopentanaldehyde, n-hexanaldehyde, isohexanaldehyde, n-heptanaldehyde, benzaldehyde and mixtures thereof.

Suitable examples of alcohols include methanol, ethanol, n-propanol, isopropanol, n-butanol, isobutanol, sec-butanol, tert-butanol, cyclobutanol, n-pentanol, isopentanol, cyclopentanol, n-hexanol, isohexanol, cyclohexanol, n-octanol, isooctanol, 2-ethylhexanol, phenol, cresol, ethylene glycol, propylene glycol and mixtures thereof.

Preferably, the modifying compound (A) is at least one compound selected from the group comprising methyl n-propyl ketone, ethyl acetate, n-butyl acetate, acetic acid, isobutyric acid, isobutyraldehyde, ethanoyl chloride, ethanol and sec-butanol, and more preferably from methyl n-propyl ketone, n-butyl acetate, isobutyric acid and ethanoyl chloride as higher catalyst productivity and higher bulk density of the products are obtained and these compounds can be used to vary molecular weight distribution of the product.

The molar ratio of modifying compound (A) to magnesium in the solid support can be in a range of from about 0.01 to about 10.0, preferably of from about 0.1 to about 5.0, more preferably of from about 0.1 to about 3.5 and most preferably of from 0.3 to 2.5, as higher catalyst productivity and higher bulk density of the products are obtained. The modifying compound (A) may be added to the reaction product obtained in step (f), preferably by stirring, at a temperature of about 15° C. to about 140° C. for a duration of about 5 minutes to about 150 minutes, preferably at a temperature of 20° C. to 80° C. for a duration of 10 minutes to 100 minutes.

The modifying compound (B) is a silicon compound represented by the general formula $R^{11}{}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different. $R^{11}$ and $R^{12}$ are independently selected from the group of compounds comprising an alkyl group, alkenyl group, alkadienyl group, aryl group, alkaryl group, alkenylaryl group and an alkadienylaryl group. $R^{11}$ and $R^{12}$ may have from 1 to 20 carbon atoms.

Suitable silicon compounds include tetramethoxysilane, tetraethoxysilane, tetra-n-propoxysilane, tetraisopropoxysilane, tetra-n-butoxysilane, tetraisobutoxysilane, methyltrimethoxysilane, ethyltrimethoxysilane, n-propyltrimethoxysilane, isopropyltrimethoxysilane, n-butyltrimethoxysilane, isobutyltrimethoxysilane, n-pentyltrimethoxysilane, n-hexyltrimethoxysilane, n-octyltrimethoxysilane, isooctyltrimethoxysilane, vinyltrimethoxysilane, phenyltrimethoxysilane, dimethyldimethoxysilane, diethyldimethoxysilane, isobutylmethyldimethoxysilane, diisopropyldimethoxysilane, diisobutyldimethoxysilane, isobutylisopropyldimethoxysilane, dicyclopentyldimethoxysilane, cyclohexylmethyldimethoxysilane, phenylmethyldimethoxysilane, diphenyldimethoxysilane, trimethylmethoxysilane, triethylmethoxysilane, methyltriethoxysilane, ethyltriethoxysilane, n-propyltriethoxysilane, isopropyltriethoxysilane, n-butyltriethoxysilane, isobutyltriethoxysilane, n-pentyltriethoxysilane, n-hexyltriethoxysilane, n-octyltriethoxysilane, isooctyltriethoxysilane, vinyltriethoxysilane, phenyltriethoxysilane, dimethyldiethoxysilane, diethyldiethoxysilane, isobutylmethyldiethoxysilane, diisopropyldiethoxysilane, diisobutyldiethoxysilane, isobutylisopropyldiethoxy silane, dicyclopentyldiethoxysilane, cyclohexylmethyldiethoxysilane, phenylmethyldiethoxysilane, diphenyldiethoxysilane, trimethylethoxysilane, triethylethoxysilane, silicon tetrachloride, methyltrichlorosilane, ethyltrichlorosilane, n-propyltrichlorosilane, isopropyltrichlorosilane, n-butyltrichlorosilane, isobutyltrichlorosilane, n-pentyltrichlorosilane, n-hexyltrichlorosilane, n-octyltrichlorosilane, isooctyltrichlorosilane, vinyl ltrichlorosilane, phenyltrichlorosilane, dimethyldichlorosilane, diethyl dichlorosilane, isobutylmethyldichlorosilane, diisopropyldichlorosilane, diisobutyldichlorosilane, isobutylisopropyldichlorosilane, dicyclopentyldichloro silane, cyclohexylmethyldichlorosilane, phenylmethyldichlorosilane, diphenyldichlorosilane, trimethylchlorosilane, triethylchlorosilane, chloro trimethoxysilane, dichlorodimethoxysilane, trichloromethoxysilane, chloro triethoxysilane, dichlorodiethoxysilane and/or trichloroethoxysilane. Preferably, the modifying compound (B) used is tetraethoxysilane, n-propyltriethoxysilane, isobutyltrimethoxysilane, dimethyldichlorosilane, n-butyltrichlorosilane and silicon tetrachloride, and more preferably isobutyltrimethoxysilane, tetraethoxysilane, n-propyltriethoxysilane, n-butyltrichlorosilane and silicon tetrachloride as higher catalyst productivity and higher bulk density are obtained with the ability to vary the molecular weight distribution of the product by employing these preferred compounds.

The molar ratio of modifying compound (B) to magnesium may be in a range of from about 0.01 to about 5.0, preferably from about 0.01 to about 3.0, more preferably from about 0.01 to about 1.0 and most preferably from about 0.01 to about 0.3, as higher catalyst productivity and higher bulk density are obtained. The modifying compound (B) may be added to the reaction product obtained in step (f), preferably by stirring, at a temperature of about 15° C. to about 140° C. during about 5 minutes to about 150 minutes, preferably at a temperature of 20° C. to 80° C. during 10 minutes to 100 minutes.

The modifying compound (C) is a transition metal alkoxide represented by the general formula $(R^{13}O)_4M$, wherein M is a titanium atom, a zirconium atom or a vanadium atom, O is an oxygen atom and $R^{13}$ is a compound selected from the group of compounds comprising an alkyl group, alkenyl group, alkadienyl group, aryl group, alkaryl group, alkenylaryl group and an alkadienylaryl group. $R^{13}$ may have from 1 to 20 carbon atoms.

Suitable transition metal alkoxide compounds include titanium tetramethoxide, titanium tetraethoxide, titanium tetra-n-propoxide, titanium tetraisopropoxide, titanium tetra-n-butoxide, titanium tetraisobutoxide, titanium tetra-n-pentoxide, titanium tetraisopentoxide, titanium tetra-n-hexoxide, titanium tetra-n-heptoxide, titanium tetra-n-octoxide, titanium tetracyclohexoxide, titanium tetrabenzoxide, titanium tetraphenoxide, zirconium tetramethoxide, zirconium tetraethoxide, zirconium tetra-n-propoxide, zirconium tetraisopropoxide, zirconium tetra-n-butoxide, zirconium tetraisobutoxide, zirconium tetra-n-pentoxide, zirconium tetraisopentoxide, zirconium tetra-n-hexoxide, zirconium tetra-n-heptoxide, zirconium tetra-n-octoxide, zirconium tetracyclohexoxide, zirconium tetrabenzoxide, zirconium tetraphenoxide, vanadium tetramethoxide, vanadium tetraethoxide, vanadium tetra-n-propoxide, vanadium tetraisopropoxide, vanadium tetra-n-butoxide, vanadium tetraisobutoxide, vanadium tetra-n-pentoxide, vanadium tetraisopentoxide, vanadium tetra-n-hexoxide, vanadium tetra-n-heptoxide, vanadium tetra-n-octoxide, vanadium tetracyclohexoxide, vanadium tetrabenzoxide, vanadium tetraphenoxide or mixtures thereof. Preferably, titanium tetraethoxide, titanium tetra-n-butoxide and zirconium tetra-n-butoxide are used because higher catalyst productivity and higher bulk density are obtained with the ability to vary the molecular weight distribution of the product by employing these preferred compounds.

The molar ratio of the modifying compound (C) to magnesium may be in the range of from about 0.01 to about 5.0, preferably from about 0.01 to about 3.0, more preferably from about 0.01 to about 1.0 and most preferably from about 0.01 to about 0.3, as higher catalyst productivity, higher bulk density and improved hydrogen response in polymerization are obtained. The modifying compound (C) may be reacted, preferably by stirring, with the product obtained in step (f) at a temperature of about 15° C. to about 140° C. for a duration of about 5 minutes to about 150 minutes, preferably at a temperature of 20° C. to 80° C. for a duration of 10 minutes to 100 minutes.

The modifying compounds (A), (B) and (C) can be contacted in any order or simultaneously with the solid magnesium containing support obtained in step (a). Preferably, (A) is added first to the reaction product obtained in step (a) and then (B), followed by the addition of (C) as higher catalyst productivity and higher product bulk density are obtained by employing this order of adding the modifying compounds. Pre-mixtures of the individual catalyst components can also be effectively utilized.

Preferably, when modifying compound (A) is methyl n-propyl ketone and modifying compound (C) is titanium tetraethoxide, a further increase of molecular weight distribution is obtained when modifying compound (B) is selected in the following order from the group consisting of isobutyltrimethoxysilane, n-propyltriethoxysilane, tetraethoxysilane, n-butyltrichlorosilane and silicon tetrachloride, at the same levels of titanium halide compound.

In the preferred case when the modifying compound (B) is silicon tetrachloride and modifying compound (C) is titanium tetraethoxide, a further improved combination of catalyst productivity and bulk density is obtained when modifying compound (A) is selected in the following order from the group consisting of isobutyraldehyde, ethyl acetate, n-butyl acetate, methyl n-propyl ketone and isobutyric acid, at the same levels of titanium halide compound.

The titanium halide compound is represented by the general formula $TiX_4$, wherein Ti is a titanium atom and X is a halide atom.

Suitable titanium halide compounds include titanium tetrachloride, titanium tetrabromide, titanium tetrafluoride or mixtures thereof. The preferred titanium halide compound is titanium tetrachloride, as higher catalyst productivity is obtained. The molar ratio of the titanium halide compound to magnesium may be in the range of about 0.01 to about 10.0, preferably from about 0.01 to about 5.0 and more preferably from about 0.05 to about 1.0, as a better balance of high catalyst productivity and high bulk density is obtained.

The titanium halide compound may be added to the reaction mixture obtained by applying step (a) and step (b) in any conventional manner, such as by stirring, at a temperature of about 15° C. to about 140° C. for a duration of about 5 minutes to about 150 minutes, preferably at a temperature of 20° C. to 80° C. for a duration of 10 minutes to 100 minutes. The reaction mixture may be then dried using a nitrogen purge and/or by vacuum at a temperature from about 15° C. to about 140° C., preferably 30° C. to 100° C. and most preferably 50° C. to 80° C. to yield the final solid catalyst component.

The total molar ratio of the modifying compound (C) and the titanium halide compound to magnesium may be in the range of from about 0.01 to about 10.0, preferably of from about 0.01 to about 5.0 and more preferably of from about 0.05 to about 1.0, as a better balance of high catalyst productivity and high bulk density is obtained.

The total molar ratio of the modifying compound (C) and the titanium halide compound to hydroxyl (OH) groups in the support after dehydration may be in the range of from about 0.01 to about 10.0, preferably of from about 0.01 to about 5.0 and more preferably of from about 0.05 to about 1.0, as a better balance of high catalyst productivity and high bulk density is obtained. Higher levels would produce high catalyst productivity though with reduced bulk density, especially in a gas phase polymerization processes. Further, applying these amounts eliminates the requirement to conduct solvent decanting, solvent filtering, solvent washing steps in catalyst preparation and hence eliminates generation of highly hazardous solvent waste material.

Chromium Based Catalyst

Chromium based catalyst can be chosen from, for example, chromium oxide based catalysts and silyl chromate based catalysts. These chromium based catalysts are described in WO2006130310, incorporated herein by reference.

The chromium oxide catalysts may be $CrO_3$, or any compound convertible to $CrO_3$ under the activation conditions employed. Compounds convertible to $CrO_3$ are, for example, disclosed in U.S. Pat. No. 2,825,721, U.S. Pat. No. 3,023,203, U.S. Pat. No. 3,622,251 and U.S. Pat. No. 4,011,382 and include chromic acetyl acetone, chromic chloride, chromic nitrate, chromic acetate, chromic sulfate, ammonium chromate, ammonium dichromate, or other soluble salts of chromate.

The silyl chromate based catalysts are characterized by the presence of at least one group of Formula I below:

wherein R, in each occurrence, is a hydrocarbyl group having from 1 to 14 carbon atoms.

Among the preferred silyl chromate based catalysts are the bis-trihydrocarbylsilylchromates of Formula II below:

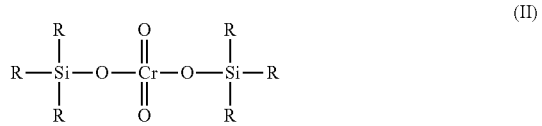

wherein R is a hydrocarbyl group having from 1 to 14 carbon atoms, such as an alkyl, alkaryl, aralkyl or an aryl radical containing from 1 to 14 carbon atoms, preferably from 3 to 10 carbon atoms. Illustrative thereof, are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p methyl-benzyl, phenyl, tolyl, xylyl, naphthyl, ethylphenyl, methylnaphthyl, dimethylnaphthyl.

Illustrative of the preferred silylchromates are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate.

Examples of such catalysts are disclosed, for example, in U.S. Pat. No. 3,324,101, U.S. Pat. No. 3,704,287 and U.S. Pat. No. 4,100,105

The chromium based catalysts of the current invention may be deposited onto conventional catalyst supports, for example, inorganic oxide materials. The inorganic oxide materials which may be used as a support for the chromium based catalysts are porous materials having a high surface area, for example a surface area in the range of 50 to 1000 square meters per gram, and a particle size of 20 to 200 microns. The inorganic oxides which may be used include silica, alumina, thoria, zirconia, aluminum phosphate and other comparable inorganic oxides, as well as mixtures of such oxides. Where both chromium oxide-based catalysts and silylchromate-based catalysts are employed together each catalyst is deposited on a separate support.

Chromium Oxide Based Catalysts

Processes for depositing the chromium species on supports are known in the art, and may be found in the previously mentioned U.S. patents. The chromium compound is usually deposited on the support from solutions thereof, and in such quantities as to provide, after the activation step, the desired levels of chromium in the catalyst. Modifying materials, such as titanium and fluoride, are generally added prior to the activation. After the compounds are placed on the supports, and are activated, there results a powdery, free-flowing particulate material.

Generally, chromium based catalysts are prepared by using commercially available silica, to which a chrome source has been added. The silica substrate may be treated with a titanium ester (titanium tetraisopropylate or titanium tetraethoxide are typically used) either, after the Cr compound is deposited, or prior to this deposition. The support is generally pre-dried at 150-200° C. to remove physically adsorbed water. The titanate may be added as a solution to a slurry of the silica in isopentane solvent or directly into a fluidized bed of support. If added in slurry form, the slurry is dried. Generally, the Cr compound, which is convertible to Cr+6, has already been added to the support. The support is then converted into active catalyst by calcination in air, at temperatures up to 1000° C.

During activation, the titanium is converted to some type of surface oxide. The chromium compound (generally chromium (III) acetate) is converted to a Cr+6 oxide of some kind. Fluoriding agents may also be added during the activation process to selectively collapse some pores in the support, modifying the molecular weight response of the catalyst. The activated catalyst may also be treated with reducing agents prior to use, such as carbon monoxide in a fluidized bed, or other reducing agents, such as aluminum alkyls, boron alkyls, lithium alkyls. Catalysts of this type are described in numerous patents, such as WO2004/094489, EP0640625, U.S. Pat. No. 4,100,105, and the references cited within these references. For example, a useful catalyst is a supported chromium-titanium catalyst (or titanated chrome oxide catalyst) which is substantially non-spherical or irregular in shape, and has a broad particle size distribution, with at least 75 percent of its pore volume ranging in pore size from 200 to 500 Angstroms. Activation of the supported chromium oxide catalyst can be accomplished at nearly any temperature up to about its sintering temperature. The passage of a stream of dry air or oxygen through the supported catalyst during the activation aids in the displacement of the water from the support and converts, at least partially, chrome species to $Cr^{+6}$. Activation temperatures from 300° C. to 900° C. for periods from greater than 1 hour to as high as 48 hours, are acceptable. Well dried air or oxygen is used and the temperature is maintained below the sintering temperature of the support.

Preferred conditions utilize a temperature from 300° C. to 900° C., preferably from 700° C. to 850° C. for at least two hours, preferably from 5 hours to 15 hours. The chromium compound, titanium compound and fluorine compound, if used, are deposited on the support, in such quantities as to provide, after the activation step, the desired levels of chromium, titanium and fluorine in the catalyst.

Preferred chromium compounds which may be used, include $CrO_3$, or any compound of chromium which is ignitable to $CrO_3$, under the activation conditions employed. Chromium compounds other than $CrO_3$ which may be used, are disclosed in U.S. Pat. No. 2,825,721 and U.S. Pat. No. 3,622,521 and include chromic acetyl acetonate, chromic nitrate, chromic acetate, chromic chloride, chromic sulfate, and ammonium chromate. Water soluble compounds of chromium, such as $CrO_3$, are the preferred compounds for use in depositing the chromium compound on the support from a solution of the compound. Organic solvent soluble chromium compounds may also be used. The titanium compounds which may be used, include all those which are ignitable to TiO$_2$ under the activation conditions employed, especially those disclosed in U.S. Pat. No. 3,622,521 and U.S. Pat. No. 4,011,382.

These compounds include those having the structures

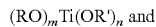

wherein m is 1, 2, 3 or 4; n is 0, 1, 2 or 3; and m+n=4; R is a C$_1$ to C$_{12}$ alkyl, aryl or cycloalkyl group, or combinations thereof, such as aralkyl, alkaryl; R' is R, cyclopentadienyl, or C$_2$ to C$_{12}$ alkenyl groups, such as ethenyl, propenyl, isopropenyl, butenyl; and Y is chlorine, bromine, fluorine or iodine.

The titanium compounds would thus include titanium tetrachloride, titanium tetraisopropoxide and titanium tetrabutoxide. The titanium compounds are conveniently deposited on the support from a hydrocarbon solvent solution thereof. The titanium (as Ti) is present in the catalyst, with respect to the Cr (as Cr), in a mole ratio of 0 to 180, and preferably of 4 to 35.

The fluorine compounds which may be used, include HF, or any compound of fluorine which will yield HF under the activation conditions employed. Fluorine compounds other than HF which may be used, are disclosed in U.S. Pat. No. 4,011,382. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The support employed for the catalyst are porous, inorganic oxide materials, having a high surface area, that is, a surface area in the range of 50 to 1000 square meters per gram, and an average particle size of 10 to 200 microns. The inorganic oxides which may be used, include silica, alumina, thoria, zirconia and other comparable inorganic oxides, as well as mixtures of such oxides. Silica, silica alumina, aluminum phosphate, silica titania and silica aluminum phosphates are preferred support compounds.

Particularly preferred supports are microspheroidal particles of surface area 200 to 500 square meters per gram, a pore diameter of 100 to 500 Angstroms, and an average particle size of 20 to 100 microns (for example, Grade 952 MS, 957HS, 957 silica available from Davison Chemical Division, W. R. Grace and Company, and Ineos EP30X, Ineos EP30XA available from Ineos Corporation and similar silica grades available from Philadelphia Quartz).

Silyl Chromate Catalysts

The silyl chromate catalysts are characterized by the presence of at least one group of Formula I below:

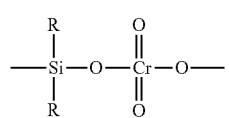

(I)

wherein R, in each occurrence, is a hydrocarbyl group having from 1 to 14 carbon atoms. Among the preferred compounds having the group of Formula I are the bis-trihydrocarbylsilylchromates of Formula II below:

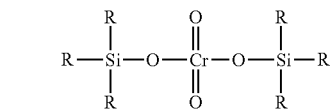

(II)

wherein R is a hydrocarbyl group having from 1 to 14 carbon atoms, such as an alkyl, alkaryl, aralkyl or an aryl radical containing from 1 to 14 carbon atoms, preferably from 3 to 10 carbon atoms. Illustrative thereof, are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl.

Illustrative of the preferred silylchromates are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate. Especially preferred compounds are bis-triphenylsilylchromate, bis-tritolylsilylchromate and bis-triadamantylsilylchromate. In order to be an active polymerization catalyst, the silylchromate must be supported on an inorganic support followed by an optional, but preferred reduction reaction, to convert some (or all) of the Cr+6 species to lower valence states.

The support employed for the catalyst are porous, inorganic oxide materials, having a high surface area, that is, a surface area in the range of 50 to 1000 square meters per gram, and an average particle size of 10 to 200 microns. The inorganic oxides which may be used, include silica, alumina, thoria, zirconia and other comparable inorganic oxides, as well as mixtures of such oxides. Silica, silica alumina, aluminum phosphate, silica titania and silica aluminum phosphates are preferred support compounds. Particularly preferred supports are microspheroidal particles of surface area 200 to 500 square meters per gram, a pore diameter of 100 to 300 Angstroms, and an average particle size of 20 to 100 microns (for example, Grade 952 MS, 955 silica available from Davison Chemical Division, W. R. Grace and Company, and Ineos EP30 available from Ineos Corporation and similar silica grades available from Philadelphia Quartz) The support employed for the catalyst must be partially dehydrated prior to attempting to support the silylchromate. The partial dehydration is typically carried out in a fluidized bed dehydrator, using nitrogen or air as the fluidizing gas. Dehydration temperatures of 300 degrees centigrade to 800 degrees centigrade may be used. Dehydration takes place over a period of 1 to 48 hours, typically from 1.5 to 8 hours. Preferred dehydration temperatures range from 350 to 600° C.

The chromate compound is then deposited on the dehydrated support material via suitable methods. The most typical method is to place the dehydrated support in suspension in an inert aromatic or aliphatic hydrocarbon (such as isopentane, hexane, heptane, toluene, mixtures of hydrocarbons) at temperatures and pressures such that the solvent remains a liquid, adding the chromate compound to the suspended support, and allowing the chromate compound to deposit on the support. It is theorized that the chromate compound reacts with the remaining surface hydroxyl groups on the support surface, leading to a supported cup-port-chromate material. Typical reaction conditions comprise reaction temperatures from 10-100° C. and reaction duration from 1 to 48 hours. Preferred temperature ranges are 35-80° C. most preferred 35-60° C. Preferred reaction times are 2 to 24 hours, more preferable 4 to 20 hours, most preferable 6 to 10 hours. Preferred solvents are isopentane, mixed pentane isomers, n-hexane, hexane isomers and heptane and heptane isomers. Most preferred solvents are saturated C5 and C6 hydrocarbons.

Following completion of the deposition reaction, the reaction product is further treated with an aluminum alkyl compound to partially or completely reduce the Cr+6 species to a lower valence state. This may be done immediately after the deposition reaction has completed, or at a later time, although sequential reaction is highly preferred. Suitable aluminum alkyl compounds are described by the formula:

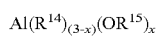

$Al(R^{14})_{(3-x)}(OR^{15})_x$ where x ranges from zero to 2; $R^{14}$ and $R^{15}$ may be the same or different, and are alkyl, alkaryl or aromatic radicals containing from 1 to 25 carbons.

Preferred $R^{14}$ or $R^{15}$ groups are methyl, ethyl, n-propyl, n-butyl, isobutyl, n-pentyl, n-hexyl, n-octyl, tolyl, and adamantyl. x is preferably 0 to 1.5, most preferably 1.0. The most preferred $R^{14}$ or $R^{15}$ group is ethyl.

The reduction reaction occurs, as indicated above, in a solvent which may be the same or different as that used for the deposition. Preferably, the same solvent is used and the reactions are sequential. Temperature and pressure are controlled to maintain the solvent in a liquid state, until drying of the suspension is begun. Typical reaction temperatures and times are 35 to 90° C. and 1 to 48 hours, respectively. Preferred reaction time is between 12 and 24 hours, at temperatures between 45 and 75° C. Following completion of the reduction reaction, the catalyst is dried under nitrogen or vacuum to a free flowing solid, and stored under essentially poison free nitrogen until use.

Incompatibility

The Ziegler-Natta catalyst used for the first polymerization and the chromium-based catalyst used for the second polymerization are incompatible. For the purposes of this patent specification and appended claims, the term "incompatible catalysts" are understood as those that satisfy one or more of the following: 1) those catalysts that in each other's presence reduce the productivity of at least one of the catalysts by greater than 50%; 2) those catalysts that under the same reactive conditions one of the catalysts produces polymers having a molecular weight (Mw) greater than two times higher than any other catalyst in the system; and 3) those catalysts that differ in comonomer incorporation or reactivity ratio under the same conditions by more than about 30%

Productivity is herein understood as kg of product per kg of catalyst over a certain period of time. Mw is herein understood as the weight average molecular weight as measured using SEC (Size Exclusion Chromatography using 1,2,4-trichlorobenzene as an eluent, and calibrated using linear polyethylene standards. The comonomer incorporation is measured by the analytical temperature rising elution fractionation (aTREF) conducted according to the method described in U.S. Pat. No. 4,798,081 and Wilde, L.; Ryle, T. R.; Knobeloch, D. C; Peat, L R.; Determination of Branching Distributions in Polyethylene and Ethylene Copolymers, J. Polym. ScL, 20, 441-455 (1982), which are incorporated by reference herein in their entirety. The composition to be analyzed is dissolved in 1,2-dichlorobenzene of analytical quality filtrated via 0.2 μm filter and allowed to crystallize in a column containing an inert support (Column filled with 150 μm stainless steel beans (volume 2500 μL) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (1,2-dichlorobenzene) from 20 to 130° C. at a rate of 1° C./min.

The instrument used may be Polymer Char Crystaf-TREF 300.

Stabilizers: 1 g/L Topanol+1 g/L Irgafos 168
Sample: approx. 70 mg in 20 mL
Sample volume: 0.3 mL
Pump flow: 0.50 mL/min The software from the Polymer Char Crystaf-TREF-300 may be used to generate the spectra.

For the purposes of this patent specification and appended claims the terms "catalysts" and "catalyst systems" are used interchangeably.

With 'continuous polymerization reaction of ethylene and a comonomer' is meant herein that ethylene and the comonomer are fed to the reactor and polyolefin thus produced is (semi)-continuously withdrawn through a polymer discharge system connected to the reactor.

Fluidized Bed

The process of this invention can be used in any polymerization process in a gas phase reactor. The gas phase reactor may be any reactor suitable for gas phase polymerizations and may e.g. be vertically, horizontally mechanically agitated reactor or a fluidized bed reactor. A gas phase polymerization process in a fluidized bed reactor is preferred. In a typical continuous gas fluidized bed polymerization process for the production of polymer from monomer, a gaseous stream comprising monomer is passed through a fluidized bed reactor in the presence of a catalyst under reactive conditions. The fluidized bed reactor contains a bed of growing polymer particles in the polymerization zone. The polymerization catalyst is continuously or intermittently introduced into the polymerization zone while the monomer is fed and the polymer is withdrawn.

Gas fluidized bed polymerization plants generally employ a continuous gas cycle. In one part of the cycle, in a reactor a cycling gas stream is heated by the heat of polymerization. This heat is removed in another part of the cycle by a cooling system external to the reactor. In one embodiment the cycle gas stream is cooled to form a gas and a liquid phase mixture that is then introduced into the reactor. A polymer product is withdrawn from the reactor. For a detailed description of a gas phase process see U.S. Pat. Nos. 4,543,399 and 4,588,790 herein fully incorporated by reference.

Using a fluidized bed polymerization process substantially reduces the energy requirements as compared to other polymerization processes and most importantly reduces the capital investment required to run such a polymerization process. In preferred embodiments, the fluidized bed is maintained in a fluidized condition during the transitioning process of this invention.

There are many types of fluidized bed reactors, among which a bubbling fluidized bed reactor, a circulating fluidized bed reactor, an annular fluidized bed reactor, a multi-zone fluidized bed reactor and a flash reactor.

With 'fluidized bed' as used herein is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

An example of a gas phase fluidized bed reactor (FBR) is shown in FIG. 1. FIG. 1 shows the multi-zone gas phase fluidized bed reactor (FBR), a compressor and a cooling unit. The bottom of the reactor comprises an inlet connected to a feeder for the reaction composition such as ethylene, nitrogen (N2), hydrogen ($H_2$), comonomer. The middle zone in the reactor above the distribution plate comprises an inlet for the polymerization catalyst that can be fed to the reactor in combination with nitrogen (N2).

The middle zone of the reactor also comprises an outlet to the product discharge tank. The top zone of the reactor comprises an outlet for a top recycle stream, wherein the outlet for the top recycle stream is connected to an inlet of the compressor. The compressor comprises an outlet for compressed fluids and the outlet of the compressor is connected to an inlet for compressed fluids of the cooling unit. The cooling unit comprises an outlet for providing a bottom recycle stream, which outlet of the cooling unit is connected to the inlet at the bottom of the reactor.

The process according to the invention may be performed in a multi-zone fluidized bed reactor.

Figure 2:
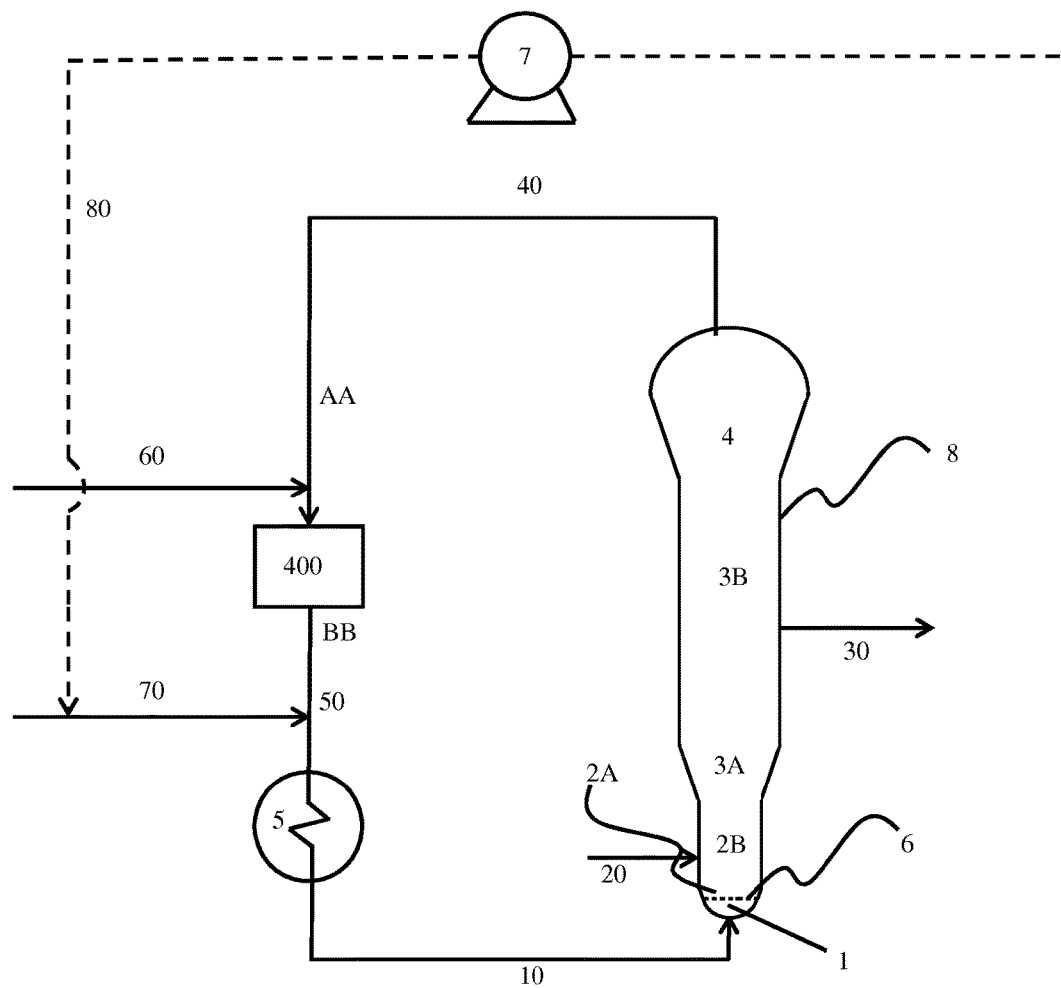
FIG. 2 shows a multi-zone fluidized bed reactor (FBR) system.

An example of a multi-zone fluidized bed reactor (FBR) system is shown in FIG. 2. The multi-zone reactor of this example is a multi-zone reactor operable in condensed mode, which multi-zone reactor comprises a first zone, a second zone, a third zone, a fourth zone and a distribution plate,
wherein the first zone is separated from the second zone by the distribution plate,
wherein the multi-zone reactor is extended in the vertical direction
wherein the second zone of the multi-zone reactor is located above the first zone and
wherein the third zone of the multi-zone reactor is located above the second zone,
and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor
wherein the largest diameter of the inner wall of the third zone is larger than the largest diameter of the inner wall of the second zone.

The multi-zone reactor of this example can operate in a so-called "condensing mode" or "condensed mode" which is effective for removal of the heat produced during the exothermic polymerization. In this mode, heat removal is achieved by cooling the gaseous recycle stream to a temperature below its dew point, resulting in the condensation of at least a part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor and enables feeding of one or more very highly active catalysts. Details of the FBR which operates in a condensing mode are further described in Application no. EP 13195141.0, incorporated herein by reference.

FIG. 2 illustrates an FBR system comprising a multi-zone reactor (8), a compressor (400) and a cooling unit (5).

The multi-zone reactor (8) of this example is extended in the vertical direction and comprises four reaction zones (1), (2), (3) and (4).

The first zone (1) comprises a first inlet for receiving a bottom recycle stream (10) and the first zone (1) is separated from the second zone (2) by a distribution plate (6).

The second zone (2) comprises a first inlet for receiving a solid polymerization catalyst (20). The third zone (3) comprises a first outlet for providing polyolefin (30). This outlet can also be located in the second zone (2). The fourth zone (4) comprises a first outlet for a top recycle stream (40) which is connected to a first inlet of the compressor (400) via a first connection means (AA). The connection means (AA) comprise a first inlet for receiving a feed (60).

The compressor (400) comprises a first outlet for compressed fluids (50) which is connected to a first inlet for compressed fluids of the cooling unit (5) via a second connection means (BB). The second connection means (BB) comprise an inlet for receiving a feed (70). The cooling unit (5) comprises a first outlet for providing the bottom recycle stream (10) which is connected to the first inlet of the first zone (1).

The FBR system may further comprise a polymer withdrawal system, a polymer degassing system and a vent gas recovery system (not shown in FIG. 2). The outlet for the recovered components (in liquid form) (80) from the vent gas recovery system may be transported to the first inlet (70) of the second connection means (BB) by means of pump (7).

This system can suitably be used for a process for continuous polymerization comprising
supplying the second zone (2) with a solid polymerization catalyst using the first inlet for receiving the solid polymerization catalyst (20)
supplying a feed (60) comprising an α-olefin monomer to the first connection means (AA)
optionally supplying a feed (70) comprising condensable inert components to the second connection means (BB)
withdrawing the polyolefin (30) using the first outlet of the second zone (2) and/or the third zone (3) and
circulating fluids from the first outlet of the fourth zone (4) to the first inlet of the first zone
wherein the fluids are circulated by
compressing the feed (60) and the top recycle stream (40) using the compressor (400) to form the compressed fluids (50)
subsequently cooling the compressed fluids (50) using the cooling unit (5) to below the dew point of the compressed fluids to form the bottom recycle stream (10) and feeding the bottom recycle stream (10) to the first zone of the multi-zone reactor (8) via the inlet for receiving the bottom recycle stream of the first zone, and wherein the superficial gas velocity in this process is in the range of 0.5 to 5 m/s.

The feed (60) comprises a chain transfer agent, for example hydrogen and may further comprise gaseous α-olefin monomers and insert gaseous components, for example nitrogen.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The above FBR system has the advantage that introduction of higher amounts of liquid is allowed without causing destabilization of the fluidized bed.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES

The gas phase reactor system as schematically shown in FIG. 1 was used for the transition process. The gaseous feed streams are mixed together in a mixing tee arrangement and enters the reactor from the bottom, and passes through a perforated distribution plate. The unreacted gas stream is separated from the entrained polymer particles, and is then compressed, cooled, and recycled back into the reactor. Product properties are controlled by adjusting reaction conditions (temperature, pressure, flow rates, etc.).

The polymerizations were conducted in a continuous gas phase fluidized bed reactor having an internal diameter of 45 cm and a reaction zone height of 228 cm. The fluidized bed was made up of polymer granules. The reactor was filled with a bed of about 50 kg of dry polymer particles that was vigorously agitated by a high velocity gas stream. The bed of polymer particles in the reaction zone was kept in a fluidized state by a recycle stream that works as a fluidizing medium as well as a heat dissipating agent for absorbing the exothermal heat generated within reaction zone.

The individual flow rates of ethylene, hydrogen and comonomer were controlled to maintain fixed composition targets. The ethylene concentration was controlled to maintain a constant ethylene partial pressure. The hydrogen/ ethylene flow ratio was well controlled to maintain a relatively steady melt index of the final resin. The concentrations of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate of about 10-15 kg/hr.

The reacting bed of growing polymer particles was maintained in a fluidized state by the continuous flow of the make-up feed and recycle gas through the reaction zone. A superficial gas velocity of 0.40 m/sec was used to achieve this. The reactor was operated at a pressure and temperature as shown in below tables. To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber. The so obtained product was purged to remove entrained hydrocarbons and treated with a small steam of humidified nitrogen to deactivate any trace quantities of residual catalyst.

The properties of the polymer were determined by the following test methods:

TABLE 1

| | |
|---|---|
| Melt Index | ASTM D-1238 - Condition E (190° C., 2.16 kg) |
| Flow Index | ASTM D-1238 - Condition F (190° C., 21.6 kg) |
| Density | ASTM D-1505 |
| Bulk Density | The resin is poured in a fixed volume cylinder of 400 cc. The bulk density is measured as the weight of resin divided by 400 cc to give a value in g/cc. |
| Average Particle Size | The particle size is measured by determining the weight of material collected on a series of U.S. Standard sieves and determining the weight average particle size based on the sieve series used. |
| Fines | The fines are defined as the percentage of the total distribution passing through a 120 mesh standard sieve. This has a particle size equivalent of 120 microns. |

A Ziegler-Natta (ZN) catalyst was used to produce 1-butene-copolymerized LLDPE having a density of 918 kg/m$^3$ and a melt index of 1.0. The LLDPE obtained is suitable for processing by blown film extrusion process. The ZN catalyst was the catalyst prepared according to example 1 of WO2012069157:

2.5 g of Sylopol 955 silica which had been dehydrated at 600° C. for 4 hours under a nitrogen flow was placed in a 40 cm3 flask. 15 cm3 of isopentane was added to slurry the silica, then 2.5 mmol of di-n-butylmagnesium was added to the flask and the resultant mixture was stirred for 60 minutes at a temperature of 35° C. Then, 3.5 mmol of methyl n-propyl ketone was added to the flask and the resultant mixture was stirred for 60 minutes at a temperature of 35° C. Then, 0.25 mmol of tetraethoxysilane was added to the flask and the resultant mixture was stirred for 30 minutes at a temperature of 35° C. Next, 0.25 mmol of titanium tetraethoxide was added to the flask and the resultant mixture was stirred for 30 minutes at a temperature of 35° C. Subsequently, 1.50 mmol of titanium tetrachloride was added to the flask and the resultant mixture was stirred for 30 minutes at a temperature of 35° C. Finally, the slurry was dried using a nitrogen purge at 70° C. for 60 minutes to yield a free-flowing solid product.

The conditions for this first polymerization are shown in Table 2.

TABLE 2

| Reactor Conditions | |
|---|---|
| Bed temperature (° C.) | 85 |
| Reactor pressure (barg) | 20.7 |
| C2 partial pressure (bara) | 7.0 |
| Bed level (mbar) | 35 |
| Superficial velocity (m/s) | 0.40 |
| $H_2$/C2 volume ratio | 0.140 |
| C4/C2 volume ratio | 0.40 |
| TEAL flow (kg/h) | 0.08 |

After running the reactor at steady state for producing the LLDPE, the feed of 1-butene flow to the reactor was stopped until the C4/C2 volume ratio was down to 0.1 or less.

Subsequently the feeding of the ZN catalyst was stopped. After the ZN catalyst feed was stopped, the feeding of the co-catalyst TEAL was maintained for an additional 30 minutes before it was stopped. The reactor conditions, i.e. the conditions of Table 2 except that C4/C2 volume ratio and TEAL flow were zero, were maintained until the reaction died. All feeds were stopped when the reaction died by first stopping the ethylene feed and subsequently stopping $H_2$ feed within 5-10 minutes after the ethylene feed was stopped.

The reactor was depressurized to 7 barg. Subsequently the reactor was flow-purged with N2 for 4 hours at a reactor temperature of 85° C. The bed temperature was subsequently decreased to 80° C.

The C2 partial pressure was increased to the target pressure in two steps. The C2 partial pressure was gradually increased up to 10 bara by feeding 10 kg/hr flow rate of C2 while maintaining the bed temperature to 80° C. In the second step, the C2 partial pressure was gradually increased up to 15 bara by feeding 5 kg/hr flow rate of C2 while maintaining the bed temperature to 80° C. When the target C2 partial pressure of 15 bara was reached, $H_2$ was introduced to reach the $H_2$/C2 volume ratio of 0.02.

Subsequently, the bed temperature was gradually increased to 95° C. by increasing 2° C. per hour.

The chromium-based catalyst was charged to the reactor. The chromium-based catalyst comprises a chromium oxide on a silica support, which was titanated by drying and then treating with tetra-isopropyltitanate prior to activation of the catalyst.

This was followed by the introduction of 1-hexene. The final reactor composition for the polymerization using the chromium-based catalyst is as listed below in Table 3.

TABLE 3

| Reactor Conditions | Target |
|---|---|
| Bed temperature (° C.) | 100 |
| Reactor pressure (barg) | 20.7 |
| C2 partial pressure (bara) | 15 |
| Bed level (mbar) | 35 |
| Superficial velocity (m/s) | 0.40 |
| $H_2$/C2 volume ratio | 0.02 |
| C6/C2 volume ratio | 0.0015 |
| TEAL flow (kg/h) | 0 |

HDPE having a density of 0.952 g/cm3 and a flow index (measured at 21.6 kg) of 10 g/10 min was successfully obtained.

A successful transitioning was achieved from a Ziegler-Natta catalyst to a chromium-based catalyst.

The invention claimed is:

1. A process for transitioning from a first continuous polymerization reaction of ethylene and a first comonomer for producing a linear low density polyethylene conducted in the presence of a Ziegler-Natta catalyst in a gas phase reactor to a second continuous polymerization reaction of ethylene and a second comonomer for producing a high density polyethylene conducted in the presence of a chromium-based catalyst in the gas phase reactor, the process comprising:
(i) reducing the feed of the first comonomer into the reactor until the ratio of the first comonomer to ethylene in the reactor is at most 0.1;
(ii) discontinuing the introduction of the Ziegler-Natta catalyst while the introduction of a co-catalyst of the Ziegler-Natta catalyst is continued and subsequently discontinuing the introduction of the co-catalyst;
(iii) maintaining the polymerization conditions in the reactor and permitting polymerization to continue for a time in order to allow the components of the Ziegler-Natta catalyst present in the reactor to consume themselves in the production of additional polymer;
(iv) discontinuing the introduction of all feeds into the reactor;
(v) depressurizing the reactor;
(vi) flow-purging the reactor;
(vii) reducing the reactor temperature;
(viii) introducing ethylene and $H_2$ into the reactor to obtain a partial pressure of ethylene and a volume ratio of $H_2$ to ethylene for the second polymerization reaction, wherein the partial pressure of ethylene is increased to the pressure for the second polymerization reaction at such a speed that the reactor temperature is maintained at a temperature lower than the temperature of the first polymerization conditions;
(ix) increasing the reactor temperature to a temperature of the second polymerization conditions;
(x) introducing the second catalyst into the reactor and
(xi) introducing the second comonomer into the reactor to obtain a reactor composition for the second polymerization reaction.

2. The process according to claim 1, wherein the polymerization conditions in step (iii) comprise a reactor temperature of 83-88° C., a reactor pressure of 15-25 barg, ethylene partial pressure of 5-10 bara, $H_2$/ethylene ratio of 0.05-0.2.

3. The process according to claim 1, wherein step (iv) is performed by discontinuing the introduction of ethylene while the introduction of $H_2$ is continued and subsequently discontinuing the introduction of $H_2$.

4. The process according to claim 1, wherein in step (v), the reactor is depressurized to 5-9 barg.

5. The process according to claim 1, wherein in step (vii), the reactor temperature is decreased to a temperature at least 4° C. lower than the temperature in step (iii).

6. The process according to claim 1, wherein in step (vii), the reactor temperature is decreased to a temperature less than 81° C.

7. The process according to claim 1, wherein step (viii) is performed by increasing the partial pressure of ethylene to an intermediate pressure at a first speed and to the partial pressure of ethylene for the second polymerization reaction at a second speed lower than the second speed.

8. The process according to claim 7, wherein the intermediate pressure is 5-7 bar lower than the pressure for the second polymerization reaction.

9. The process according to claim 1, wherein in step (viii), the introduction of $H_2$ to the reactor is started after the partial pressure of ethylene for the second polymerization reaction is reached.

10. The process according to claim 1, wherein the partial pressure of ethylene for the second polymerization reaction is 13-17 bara and the volume ratio of $H_2$ to ethylene for the second polymerization reaction is 0.01-0.015.

11. The process according to claim 1, wherein the first comonomer is 1-butene or 1-hexene.

12. The process according to claim 1, wherein the second comonomer is 1-hexene.

13. The process according to claim 1, wherein the Ziegler-Natta catalyst is prepared by
  (a) contacting a dehydrated support having hydroxyl groups with a magnesium compound having the general formula $MgR^1R^2$, wherein $R^1$ and $R^2$ are the same or different and are independently selected from the group comprising an alkyl group, alkenyl group, alkadienyl group, aryl group, alkaryl group, alkenylaryl group and alkadienylaryl group;
  (b) contacting the product obtained in step (a) with modifying compounds (A), (B) and (C), wherein:
    (A) is at least one compound selected from the group consisting of carboxylic acid, carboxylic acid ester, ketone, acyl halide, aldehyde and alcohol;
    (B) is a compound having the general formula $R^{11}_f(R^{12}O)_g SiX_h$, wherein f, g and h are each integers from 0 to 4 and the sum of f, g and h is equal to 4 with a proviso that when h is equal to 4 then modifying compound (A) is not an alcohol, Si is a silicon atom, O is an oxygen atom, X is a halide atom and $R^{11}$ and $R^{12}$ are the same or different and are independently selected from the group comprising an alkyl group, alkenyl group, alkadienyl group, aryl group, alkaryl group, alkenylaryl group and alkadienylaryl group;
    (C) is a compound having the general formula $(R^{13}O)_4M$, wherein M is a titanium atom, a zirconium atom or a vanadium atom, O is an oxygen atom and $R^{13}$ is selected from the group comprising an alkyl group, alkenyl group, alkadienyl group, aryl group, alkaryl group, alkenylaryl group and alkadienylaryl group; and
  (c) contacting the product obtained in step (b) with a titanium halide compound having the general formula $TiX_4$, wherein Ti is a titanium atom and X is a halide atom.

14. The process according to claim 4, wherein in step (v), the reactor is depressurized to 6-8 barg.

* * * * *